(12) United States Patent
Ku (10) Patent No.: US 6,260,098 B1
(45) Date of Patent: Jul. 10, 2001

(54) SHARED PERIPHERAL CONTROLLER

(75) Inventor: Yi-Ming Ku, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/215,023

(22) Filed: Dec. 17, 1998

(51) Int. Cl.$^7$ .............. G06F 13/38; G06F 3/00; G06F 5/00; G06F 13/00; G06F 15/16

(52) U.S. Cl. .............. 710/130; 710/29; 710/36; 710/52; 710/59; 710/107; 710/129; 709/100; 709/107; 709/248; 709/400

(58) Field of Search .................. 709/100, 101, 709/102, 103, 104, 107, 200, 224, 225, 229, 248, 400; 710/3, 5, 29, 36, 37, 52, 56, 59, 61, 107, 108, 113, 126, 127, 128, 129, 130, 200, 240; 711/220

(56) References Cited

U.S. PATENT DOCUMENTS

| | | | | |
|---|---|---|---|---|
| 4,380,798 | * | 4/1983 | Shannon et al. | 364/200 |
| 5,123,091 | * | 6/1992 | Newman | 395/200 |
| 5,426,740 | * | 6/1995 | Bennett | 395/325 |
| 5,548,780 | * | 8/1996 | Krein | 395/825 |
| 5,568,630 | * | 10/1996 | Killan et al. | 395/375 |
| 5,598,535 | * | 1/1997 | Brech et al. | 395/200.13 |
| 5,701,546 | * | 12/1997 | Shimomura et al. | 395/849 |
| 5,761,443 | * | 6/1998 | Kranich | 395/280 |
| 5,761,450 | * | 6/1998 | Shah | 395/287 |
| 5,805,823 | * | 9/1998 | Seitz | 395/200.66 |
| 5,812,789 | * | 9/1998 | Diaz et al. | 395/200.77 |
| 5,850,530 | * | 12/1998 | Chen et al. | 395/293 |
| 5,850,557 | * | 12/1998 | McTague et al. | 395/735 |
| 5,860,112 | * | 1/1999 | Langerdorf et al. | 711/143 |
| 5,892,964 | * | 4/1999 | Horan et al. | 395/800.23 |
| 5,894,555 | * | 4/1999 | Harada et al. | 395/200.43 |
| 5,915,104 | * | 6/1999 | Miller | 395/309 |
| 5,920,881 | * | 7/1999 | Porterfield | 711/2 |
| 5,974,480 | * | 10/1999 | Qureshi et al. | 710/27 |
| 5,987,552 | * | 11/1999 | Chittor et al. | 710/128 |
| 6,047,339 | * | 4/2000 | Su et al. | 710/56 |

(List continued on next page.)

*Primary Examiner*—Thomas Lee
*Assistant Examiner*—Tanh Nguyen
(74) *Attorney, Agent, or Firm*—Joseph P. Lally; Leslie A. Van Leeuwen (57) ABSTRACT

A shared peripheral controller including a primary bus interface, a primary bus first register, a shared bus interface, and a control unit. The primary bus interface is adapted to receive an operation via a primary bus, such as an ISA bus, from a first processor, such as a PCI-to-ISA bus bridge. The shared bus interface is adapted to communicate with a first shared peripheral, such as a real time clock, via a shared bus. The control unit is coupled to the primary bus interface and configured to detect a first segment of a first operation issued by the first processor to the first shared peripheral. The control unit is further configured to buffer the first segment in the primary bus first register until the control unit detects a second segment of the first operation whereupon the control unit is configured to issue the first and second segments of the first operation to the first shared peripheral in consecutive cycles of the shared bus. In the preferred embodiment, the controller further includes a secondary bus first register and a secondary bus interface that is adapted to receive an operation via a secondary bus, such as a 68000 bus, from a second processor, such as a service processor. In this embodiment, the control unit is coupled to the secondary bus interface and configured to detect a first segment of a second operation that is issued by the second processor and further adapted to buffer the second operation's first segment in the secondary bus first register until the control unit detects a second segment of the second operation whereupon the second operation's second segment, the control unit issues the second operation's first and second segments to the first shared peripheral in consecutive cycles of the shared bus.

17 Claims, 3 Drawing Sheets

U.S. PATENT DOCUMENTS 6,098,122 * 8/2000 Emmes et al. ............................ 710/29
6,115,551 * 9/2000 Chao ..................................... 395/882
6,115,770 * 9/2000 Gehman ............................... 710/128
6,134,613 * 10/2000 Stephenson et al. ................. 710/102
6,134,698 * 10/2000 Gulick .................................. 714/798
6,141,728 * 10/2000 Simionescu et al. ................. 711/113
6,148,356 * 11/2000 Archer et al. ........................ 710/127
6,157,397 * 12/2000 Bogin et al. ......................... 345/511
6,178,517 * 1/2001 Bertin et al. ......................... 713/324

* cited by examiner

SHARED PERIPHERAL CONTROLLER

BACKGROUND

1. Field of the Present Invention

The present invention genenrlly relates to the field of microprocessor based computers and more particularly to a device and method for sharing a peripheral between processors coupled to the peripheral via two distinct busses.

2. History of Related Art

Microprocessor based computer systems implement various peripheral devices to extend the capability of the system and to reduce the work load placed upon the system's central processing unit. These peripheral devices are coupled to the central processing unit over one or more peripheral busses. These peripheral busses have evolved over time as peripheral devices have become increasingly complex and increasingly fast. The Industry Standard Architecture (ISA) bus was developed in the relatively early stages of microprocessor based computing systems. While the ISA bus had numerous drawbacks that eventually necessitated the development of newer busses, a large number of peripheral devices and adapters designed according to the ISA specification are still prevalent in more modern systems. One of the drawbacks of the ISA bus was its relatively narrow (16bit) I/O address bus. Because only a small number of devices can be uniquely addressed with the ISA address bus, indirect addressing was implemented to expand the capability of ISA devices without altering the specification itself. In an indirect addressing scheme, a device may include multiple internal registers that are individually accessible to the outside world through a single index register, which is given a unique ISA address. The index register is written with a data field indicating which of the internal registers is to be addressed in a subsequent cycle. In the subsequent cycle, a data register, which also has a unique ISA address is read or written to store to or retrieve information from the internal register indicated by the index register.

Prior to the wide spread proliferation of local area networks and network servers, the two cycles required to implement in direct addressing with the ISA bus was an acceptable compromise to maintain compatibility with the enormous base of hardware and software drivers developed around the standard. In many network servers and other sophisticated machines, however, peripheral devices may be accessible from or shared by more than one bus. Sharing of a peripheral device, coupled with the multiple cycle addressing scheme utilized in ISA architectures can lead to improper operation if a processor on one bus is permitted to alter the contents of a shared peripheral's index register while a processor on another bus is attempting to modify or retrieve the contents of the peripheral's data register. Moreover, it is impracticable to address this problem by requiring a software revision to peripheral device drivers for every potentially problematic peripheral device. Accordingly, it is highly desirable to implement a solution for sharing a peripheral device that may require indirect addressing between multiple busses without significantly impacting the performance of the device or system and without requiring revision to existing peripheral device drivers.

SUMMARY OF THE INVENTION

Broadly spealdng the present invention contemplates a shared peripheral controller that includes a primary bus interface, a primary bus first register, a shared bus interface, and a control unit. The primary bus interface is adapted to receive an operation via a primary bus, such as an ISA bus, from a first processor, such as a PCI-to-ISA bus bridge. The shared bus interface is adapted to communicate with a first shared peripheral, such as a real time clock, via a shared bus. The control unit is coupled to the primary bus interface and configured to detect a first segment of a first operation issued by the first processor to the first shared peripheral. The control unit is further configured to buffer the first segment in the primary bus first register until the control unit detects a second segment of the first operation. In response to detecting the second segment, the control unit is configured to issue the first and second segments of the first operation to the first shared peripheral in consecutive cycles of the shared bus.

Preferably the first segment of the first operation includes a data field and an address field where the address field of the first segment is indicative of a primary bus address associated with the first shared peripheral. Preferably, the buffering of the first segment comprises storing the data field in the primary bus first register in response to detecting that the address field matches the primary bus address of the first shared peripheral. In a preferred embodiment, the first shared peripheral includes a plurality of internal register, and the data field of the first segment is indicative of a selected internal register of the first shared peripheral.

In the preferred embodiment, the controller further includes a secondary bus first register and a secondary bus interface that is adapted to receive an operation via a secondary bus, such as a 68000 bus, from a second processor, such as a service processor commonly encountered in a server machine. In this embodiment, the control unit is coupled to the secondary bus interface and configured to detect a first segment of a second operation that is issued by the second processor. The control unit is further adapted to buffer the second operation's first segment in the secondary bus first register until the control unit detects a second segment of the second operation. When the control unit detects the second operation's second segment, the control unit issues the second operation's first and second segments to the first shared peripheral in consecutive cycles of the shared bus.

For embodiments including more than one shared peripheral on the shared bus, the controller may further include a second register set including a primary bus second register and a secondary bus register. In this embodinent, the control unit is configured to detect a first segment of an operation issued by the first processor and destined for the second shared peripheral. The control unit buffers the first segment in the primary bus second register until a second segment of the operation is detected whereupon the controller is configured to issue the first and second segments of the operation to the second shared peripheral in consecutive cycles of the shared bus. Similarly, the control unit detects and buffers a first segment of an operation issued by the second processor for the second shared peripheral in the secondary bus second register until the operation's second segment is detected and then issues the first and second segments to the second shared peripheral in consecutive cycles.

The present invention further contemplates a method of controlling access to a first shared peripheral that is accessible via a primary bus and a secondary bus. A first segment of a first operation issuing from a first processor via the primary bus is detected and buffered in a primary bus first register until a second segment of the first operation is detected. Prior to detecting the second segment, bus activity on the secondary bus may be detected. When the first operation's second segment is ultimately detected, the first and second segments of the first operation are issued to the first shared peripheral device via a shared bus in consecutive cycles of the shared bus. In this manner any activity occurring on the secondary bus between the first and second segments of the first operation is prevented from reaching the shared bus between the first and second segments. In the preferred embodiment, the method further includes detecting a first segment of a second operation issued by a second processor via the secondary bus and buffering the second operation's first segment in a secondary bus first register until a second segment of the second operation is detected. Prior to detecting the second operation's second segment, bus activity on the primary bus may be detected. Upon detecting the second operation's second segment, the second operation's first and second segments are issued to the first shared peripheral device via the shared bus in consecutive cycles of the shared bus. In this manner, any activity occurring on the primary bus between the second operation's first and second segments is prevented from occurring on the shared bus between the second operation's first and second segments. Preferably the step of detecting the first segment is achieved by comparing an address field of the first segment to a primary bus address associated with the first shared peripheral. In this embodiment, the buffering of the first segment includes storing the primary bus data field in the primary bus first register.

The present invention still further contemplates a computer system. The system includes a central processing unit and a system memory coupled to the central processing unit via a host bus. A host bus bridge is coupled between the host bus and a peripheral bus, such as a PCI bus. A first processor is coupled between the PCI bus and a primary bus. In one embodiment, the primary bus is an ISA bus and the first processor is a PCI-to-ISA bridge device. The system further includes a second processor coupled a secondary bus and a shared peripheral controller connected to the primary and secondary busses. In one embodiment, the second bus is a 68000type bus and the second processor is a service processor. A first shared peripheral of the system, such as a real time clock, is coupled to the shared peripheral controller via a shared bus. The shared peripheral controller is configured to detect a first segment of a first operation from the first processor and further configured to buffer the first segment in a primary bus register until the controller detects a second segment of the first operation, whereupon the controller is configured to issue the first and second segments of the first operation to the peripheral device in consecutive cycles of the shared bus. With this system, activity on the secondary bus that is detected by the controller intermediate between the first operation's first and second segments is prevented from occurring on the shared bus intermediate between the first operation's first and second segments. The shared peripheral controller is preferably further configured to detect a first segment of a second operation from the second processor. The controller is adapted to buffer the second operation's first segment in a secondary bus register until the controller detects the second operation's second segment. The controller is configured to then issue the first and second segments of the second operation to the peripheral device in consecutive cycles of the shared bus thereby preventing activity occurring on the primary bus detected by the controller intermediate between the second operation's first and second segments from occurring on the shared bus intermediate between the second operation's first and second segments. In one embodiment, the first shared peripheral includes multiple internal registers. Each of the internal registers is indirectly addressable by storing an internal register address in an index register of the first shared peripheral and thereafter addressing a data register of the first shared peripheral.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT

OF THE PRESENT INVENTION

Figure 1:
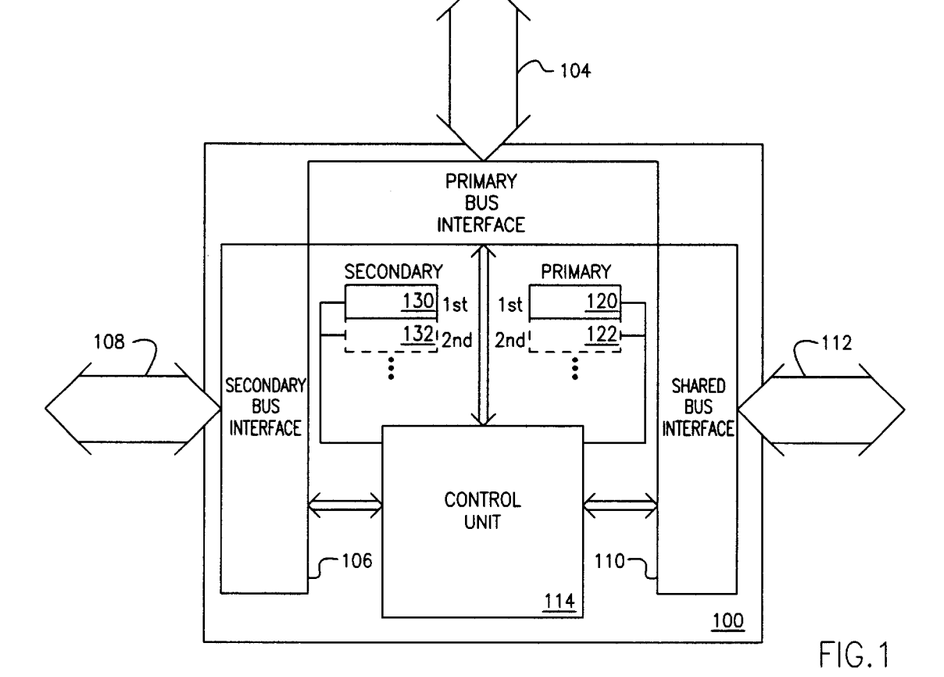
FIG. 1 is a simplified block diagram of a shared peripheral controller according to the present invention.

Turning now to the drawings, FIG. 1 depicts a shared peripheral controller 100 according to the present invention. Shared peripheral controller 100 includes a primary bus interface 102 adapted to receive commands or operations from and issue operations to devices coupled to primary bus 104, which is suitably comprised of data, address, and control fields commonly encountered in any of a variety of bus standards and specifications. In one embodiment of the invention, primary bus 104 complies with the Industry Standard Architecture (ISA) bus specification well known to those familiar with the design of IBM PC compatible microprocessor based computer systems. Shared peripheral controller 100 similarly includes a secondary bus interface 106 configured to receive operations from devices present on a secondary bus 108. Like primary bus 104, secondary bus 108 may comply with any of various standardized bus architectures. In one embodiment useful in server applications, secondary bus 108 is a Motorola 68000 type bus suitable for coupling to a service processor as will be described in greater detail below. Primary bus interface 102 and secondary bus interface 106 are coupled to a control unit 114 that is configured to monitor and manage operations on primary bus 104 and secondary bus 108 such that the two busses are prevented from accessing one or more common or shared peripherals in a manner that would result in erroneous operation. Each of the shared peripheral (not depicted in FIG. 1) is coupled to control unit 114 via a shared bus interface 110 of shared peripheral controller 100.

In one suitable embodiment, shared peripheral controller 100 is implemented to manage access to peripheral devices that are addressed in an indirect manner requiring two or more cycles. If indirectly addressed peripheral devices are accessible from more than one bus, there is a risk that activity on one of the busses may adversely affect the interpretation of activity on the other bus resulting in improper or undesired results. Thus, control unit 114 is configured, in the preferred embodiment, for use in connection with operations requiring multiple cycles or segments. Preferably, control unit 114 is configured to detect a first segment of a first operation issued by a first processor coupled to primary bus 104 and destined for a first shared peripheral. For purposes of this invention, a processor is defined as a device capable of issuing an operation and may include any suitable bus master such as a central processing unit, an embedded processor, or a bus bridge. Upon detecting the first segment of this first operation, control unit 114 is further configured to buffer the first segment in a primary bus first register 120 accessible to control unit 114, thereby preventing the first segment of the first operation from reaching shared bus 112. The first segment is buffered in register 120 until a second segment of the first operation is subsequently detected. Upon detecting the second segment, control unit 114 is still further designed to issue the first and second segments of the first operation to the targeted device (i.e., the first shared peripheral) on shared bus 112 in consecutive cycles of shared bus 112. In this manner, activity on secondary bus 108 that occurs in the period between the first operation's first and second segments does not result in an improperly interpreted command sequence on shared bus 112. In other words, by insuring that multiple cycle commands are issued in consecutive cycles, shared peripheral controller 100 enables reliable and safe sharing of a peripheral device.

In the preferred embodiment, shared peripheral controller 100 is configured similarly with respect to operations received via secondary bus 108. More specifically, control unit 114 is preferably designed to detect a first segment of a second operation issued by a second processor that is coupled to secondary bus 108 and destined for the first shared peripheral on shared bus 112. Upon detecting the second operation's first segment, control unit 114 is configured to buffer the second operation's first segment in a secondary bus first register 130 accessible to control unit 114. The second operation's first segment is buffered in secondary bus first register 130 until the second operation's second segment is detected, at which time control unit 114 is configured to issue the first and second segments of the second operation to the first shared peripheral via shared bus 112 in consecutive cycles of shared bus 112 thereby eliminating the possibility of issuing an incorrect operation over shared bus 112 that might otherwise be caused by activity from primary bus 104 that occurs intermediate between the second operation's first and second segments.

In embodiments designed for use with more than one shared peripheral, shared peripheral controller 100 includes additional buffer registers. In the depicted embodiment, a second set of buffer registers is indicated in phantom by primary bus second register 122 and secondary bus second register 132. This second set of registers is associated with a second shared peripheral that is coupled to shared peripheral controller 100 via shared bus 112. Upon detecting a first segment of a primary bus operation destined for this second shared peripheral, control unit 114 of shared peripheral controller 100 buffers the first segment in primary bus second register 122 until the second segment of the operation destined for the second shared peripheral is detected. Similarly, the embodiment of shared peripheral controller 100 depicted in FIG. 1 is configured to store a first segment of a secondary bus operation destined for a second shared peripheral in secondary bus second register 132 until a second segment of the operation is detected. It will be appreciated that additional sets of buffer registers may be added to shared peripheral controller 100 as needed within the scope of the present invention to accommodate additional shared peripherals coupled to share bus 112.

In one embodiment in which shared peripheral controller 100 is particularly advantageous, first bus 104 and secondary bus 108 operate asynchronously, as in the case in which primary bus 104 is an ISA bus and secondary bus 108 is a 68000 bus. In such embodiments, control unit 114 is further configured to arbitrate access to shared bus 112 and the device on the bus which is not granted access to shared bus 112 will typically extend its cycle until access to shared bus 112 is available.

Figure 2:
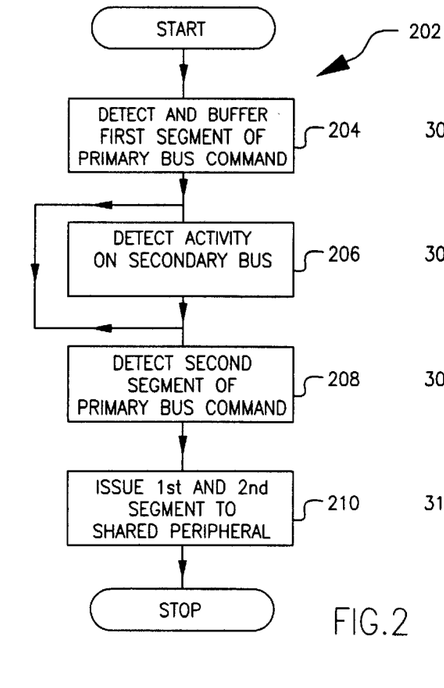
FIG. 2 is a flow diagram of a method of sharing a peripheral device according to the invention.
Figure 3:
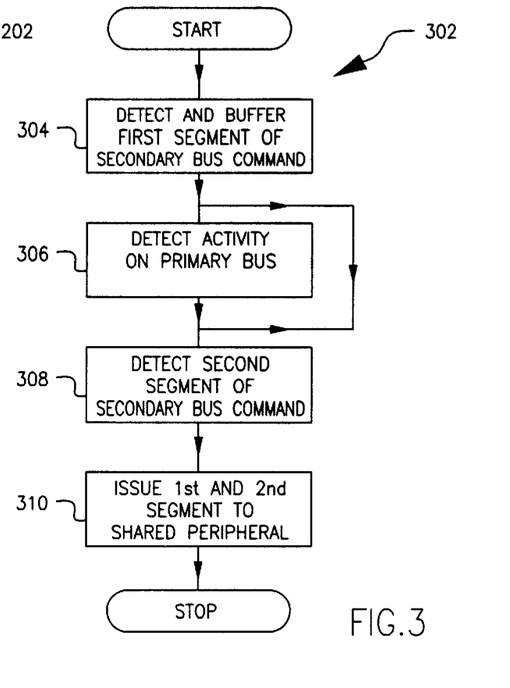
FIG. 3 is a flow diagram of a preferred extension of the method of FIG. 2.

The operation of shared peripheral controller 100 discussed in the preceding paragraphs may be described as a method of controlling access to a shared peripheral. Turning to FIGS. 2 and 3, flow diagrams of methods 202 and 302 according to the present invention are presented. Method 202 includes a step 204 in which a first segment of a first operation is detected and buffered. The first operation is suitably issued by a first processor coupled to a primary bus. Subsequent to detecting the first segment of the first operation, activity associated with a secondary bus may be detected. The detection of such secondary bus activity is indicated by reference numeral 206. The secondary bus activity detected during step 206 may include any sequence or combination of secondary bus operations and may include, for example, a complete secondary bus operation that is issued to shared bus 112. The flow diagram depicts dual paths, one of which circumvents step 206 thereby indicating that detection of activity on the secondary bus is not required. In other words, method 202 provides for the buffering of the first segment and the subsequent issuance of the first and second segments in consecutive peripheral bus cycles regardless of intermediate activity on the secondary bus. In step 208, the first operation's second segment is detected. Because the preferred embodiment of the present invention contemplates a peripheral device coupled to more than one bus, it cannot be assumed that the first and second segments of an operation on one bus will arrive at the shared peripheral in consecutive cycles. Method 202 of the present invention resolves this potential problem but stalling the first segment of the operation until the second segment is detected and then insuring that the segments are issued in consecutive cycles as indicated in step 210. In one embodiment, the second segment of primary bus 104 is extended until the first and second segments are issued to shared bus 112. Method 302 of FIG. 3 presents a flow diagram of a preferred extension of method 202. In method 302, the present invention assures that multiple segment operations originating on the secondary bus are issued to the shared peripheral in consecutive cycles in the same manner that method 202 assures that primary bus operations are presented to the shared peripheral in consecutive cycles. Accordingly, method 302 includes step 304, in which a first segment of a secondary bus operation is detected and buffered. Subsequent to the detection of the second operation's first segment, activity on the primary bus may be detected in step 306. The primary bus activity detected during step 306 may include any sequence or combination of primary bus operations, including, for example, a complete primary bus operation that is issued to shared bus 112. Regardless of whether such primary bus activity is detected, the second operation's first segment is buffered until the second operation's second segment is detected in step 308. Upon detecting the second segment, the second operation's first and second segments are issued to the shared peripheral in consecutive cycles. Although not explicitly indicated, it will be appreciated that methods 202 and 302 may be extended to accommodate additional shared peripherals by buffering the first segments of operations detected on the primary and secondary busses according to each operation's destination shared peripheral. Thus for example, an extension of method 202 would include detecting a first segment of a primary bus operation destined for a second shared peripheral and buffering the first segment until a second segment of the primary bus operation destined for the second shared peripheral is detected and thereafter issuing the first and second segments in consecutive cycles of the shared bus to the second shared peripheral. Analogous extensions of method 302 will be apparent to skilled practitioners having the benefit of this disclosure.

Figure 6:
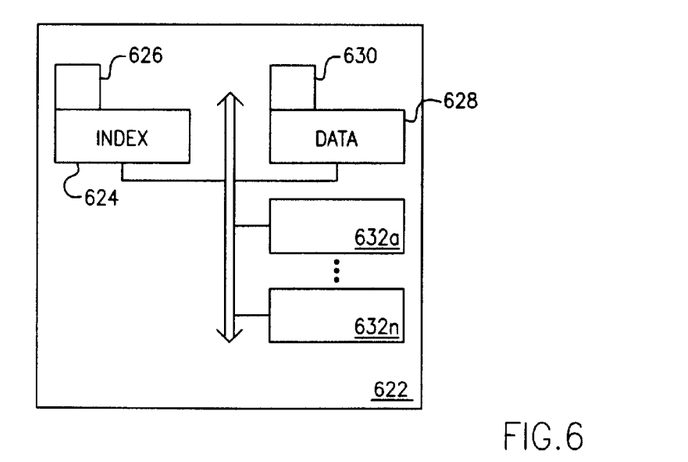
FIG. 6 is a block diagram of a shared peripheral device for use in preferred embodiments of the invention.

Turning momentarily, to FIG. 6, one embodiment of a shared peripheral 622 suitable for use in connection with shared peripheral controller 100 of the present invention is presented Shared peripheral 622 includes an index register 624, an index register tag 626, a data register 628, a data register tag 630, and a plurality of internal registers indicated by reference numerals 632a through 632n. Index register tag 626 and data register tag 630 indicate the bus addresses of index register 624 and data register 628 respectively. Each of the internal registers 632 is externally accessible with an indirect addressing scheme which includes storing an appropriate index value in index register 624 and then accessing the indexed internal register 632 through data register 628. It will be appreciated that while indirect addressing in this manner beneficially permits access to a relatively large number of internal registers while preserving the relatively scarce available bus addresses, it requires a multiple cycle operation to complete an operation with shared peripheral 622. Because shared peripheral 622 is accessible via more than one bus as contemplated in the present invention, this multiple cycle, indirect addressing scheme can result in incorrect operation. If, for example, a processor on one of the busses accessible to shared peripheral 622 writes a value in index register 624 corresponding to the desired internal register 632 and, before this processor is able to read or write the corresponding value from data register 628, a processor on another bus overwrites index register 624 with a different value, the processor on the first bus will be unaware of this alteration unless directed, through a revision to the peripheral's device driver, to check the value of index register 624 immediately prior to each access of data register 628. Without such a check, the processor on the first bus may access data register 628 under the false assumption that the value in index register 624 has not changed, thereby resulting in incorrect operation. To eliminate the need to rewrite a potentially significant number of device drivers to accommodate multiple bus access to a single shared peripheral, the present invention contemplates a method of accommodating shared access to shared peripheral 622 with a hardware solution.

Figure 4:
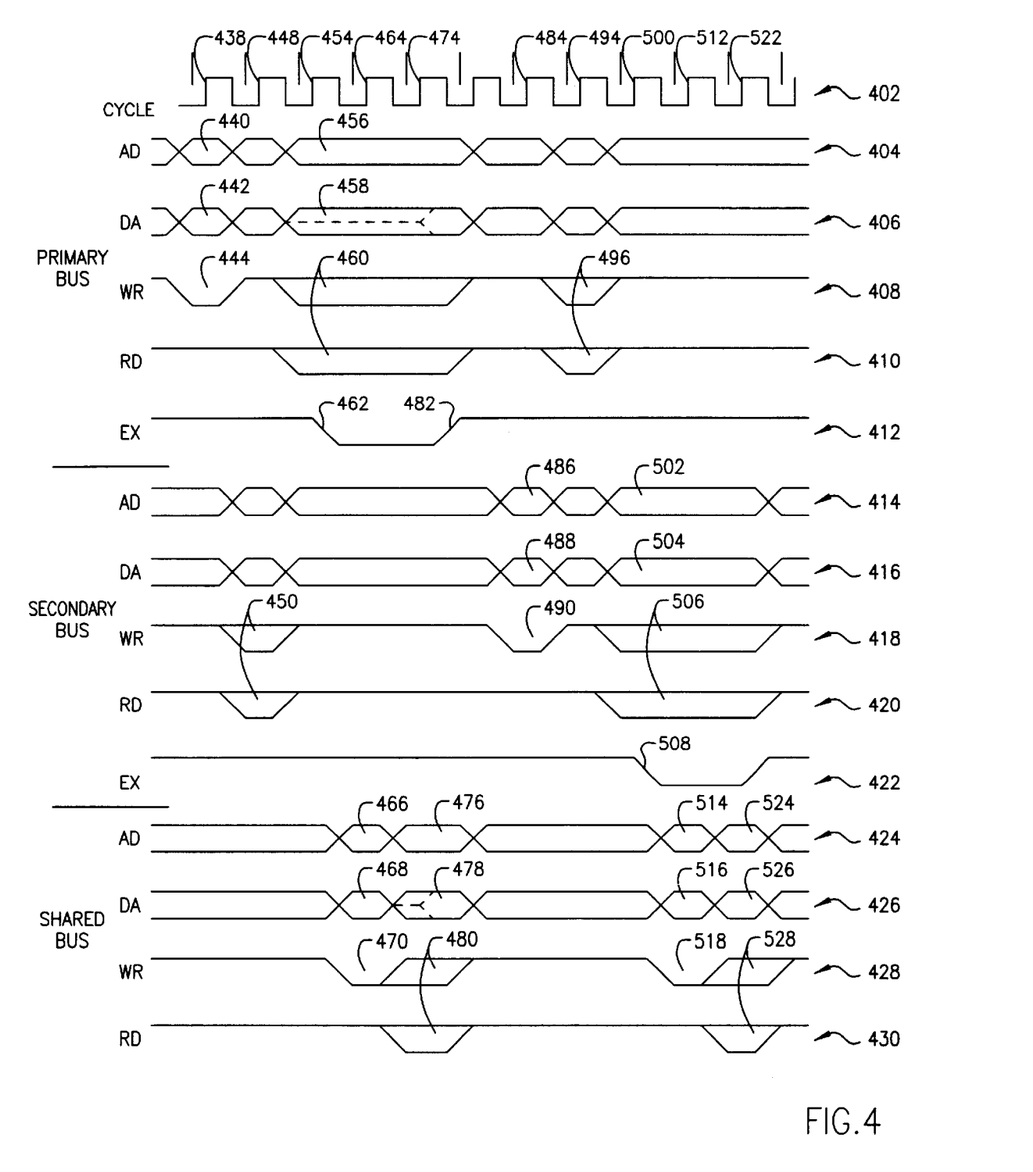
FIG. 4 is a timing diagram showing operation of the shared peripheral controller of FIG. 1.

Turning now to FIG. 4, a timing diagram depicting details of a preferred embodiment of the present invention is presented. The timing diagram of FIG. 4 indicates data, address, and control signals for primary bus 104 (as shown in FIG. 1), secondary bus 108, and shared bus 112. For the sake of simplicity and clarity, a cycle signal 402 is shown to indicate state transitions although it will be appreciated that, in the preferred embodiment, primary bus 104 and secondary bus 108 operate asynchronously. Various cycles of cycle signal 402 are indicated by reference numerals indicating a rising edge of cycle signal 402. Cycle 438 represents the first segment of a first operation originating from primary bus 104 and destined for a first shared peripheral. In this first segment, primary bus address field 440 is set to the value of the first shared peripheral's index register tag 626. In an embodiment, for example, in which primary bus 104 is an ISA bus and the first shared peripheral is a real time clock, the index register tag value (or bus address) is 0070h and thus, address field 440 is 0070h. The data field 442 of primary bus data signals 406 is set according to the internal register 632 of shared peripheral 622 that is to be accessed. Inspection of shared bus signals 424, 426, 428 and, 430 during cycle 438 reveals that shared peripheral controller 100 prevents the first segment activity on the primary bus from reaching shared bus 112. Instead, the data field 442 is stored in primary bus first register 120 until a second segment of the operation is detected. In one embodiment, the address field 440 indicative of the bus address of index register 624, may be additionally stored in register 120 for subsequent retrieval following detection of the second segment. In another embodiment, each primary and secondary bus register set of shared peripheral controller 100 may be hardwire associated with a specific shared peripheral device thereby eliminating the need to stored data field 440. For example, in the embodiment mentioned previously, primary bus first register 120 and secondary bus first register 130 may each be logically associated with a real time clock on shared bus 112 such that, control unit 114 automatically generates a 0070h as the address field when it ultimately issues the first segment to shared bus 112.

After the first segment has been detected and buffered in the described manner, cycle 448 of FIG. 4 indicates a cycle during which secondary bus activity is detected by shared peripheral controller 100. This secondary bus activity is indicated by reference numeral 450 indicating assertion of a secondary bus write signal 418 or a secondary bus read signal 420. During the secondary bus activity indicated by reference numeral 448, the first segment of the first operation from primary bus 104 remains buffered in primary bus first register 120. Although cycle 448 is depicted as occurring in a single cycle of cycle signal 402, the invention contemplates that multiple cycles of secondary bus activity may transpire during the time that the first segment is buffered in primary bus first register 120. This secondary bus activity may include any combination or sequence of secondary bus operations including, for example, a complete secondary bus operation (ie., a secondary bus operation that includes a first and second segment) that is issued to shared bus 112. Thus, although the diagram indicates no shared bus activity during cycle (or cycles) 448, it will be appreciated that there may be shared bus activity originating from secondary bus 112. The absence of shared bus activity is intended to indicate that the primary bus operation is prevented from generating shared bus activity until the second segment is detected. Eventually, a second segment of the first operation is detected. Cycle 454 of FIG. 4 represents the cycle during which shared peripheral controller 100 detects the second segment of the first operation from primary bus 104. The second segment is characterized by an address field 456 corresponding to the value of data register tag 630 of shared peripheral 628 accompanied by an assertion of either (but not both) the primary bus write signal 408 or primary bus read signal 410 as indicated with reference numeral 460. In an embodiment of the invention in which shared peripheral 622 is a real time clock, for example, the address field 456 of primary bus address 404 is set to 0071h corresponding to the value of data register tag 630 for a real time clock. The value of the data field 458 depends upon the type of cycle executing. If the cycle is a write cycle, primary bus write cycle signal 408 is asserted and data field 458 represents the value of the data written to the appropriate internal register 632 of shared peripheral 622. If primary bus read signal 410 is asserted duing cycle 454, the data field 458 is indicated by dashed lines and represents the data read from the appropriate internal register 632. (It is noted that in the case of a data read cycle, valid data is not present on primary bus data lines until a minimum access time has transpired from the assertion of the read signal).

Upon detecting the second segment cycle 454 of the primary bus operation, shared peripheral controller 100 and control unit 114 are configured to issue the first and second segments over shared bus 112 in consecutive cycles of shared bus 112. These consecutive shared bus cycles occur in the timing diagram of FIG. 4 at the cycles indicated by reference numerals 464 and 474. Cycle 464 effectively mirrors the cycle 438 that occurred on primary bus 104. The address field 466 of shared bus address signals 424 corresponds to address field 440 of cycle 438 while data field 468 of shared bus data signals 426 corresponds to data field 442 of cycle 438. Similarly, address field 476 and data field 478 of cycle 474 correspond to address field 456 and data field 458 of cycle 454 respectively. An assertion of shared bus write signal 428 indicated by reference numeral 470 corresponds to the assertion of primary bus write signal 408 indicated in cycle 438 while the assertion of either the write signal or shared bus read signal 430 indicated by reference numeral 480 corresponds to the assertion 460 in cycle 454 discussed previously. In this manner, shared peripheral controller 100 and control unit 114 are configured to issue the primary bus operation over shared bus 112 in consecutive cycles thereby preventing undesired operation that could occur if index register 624 of shared peripheral 622 was written by a device on secondary bus 108 in the middle of a primary bus operation. Moreover, shared peripheral controller 100 and control unit 114 accomplish the sharing of shared peripheral 622 without requiring modification of drivers written for shared peripheral 622. In one embodiment of the invention, control unit 114 assures an uninterrupted consecutive cycle execution of the shared bus by asserting primary bus extended cycle signal 412 as indicated by reference numeral 462 upon detecting the second segment of the first operation in cycle 454. In an embodiment in which primary bus 104 is an ISA bus, extended cycle signal 412 may suitably comprise the IOCHRDY signal. The extended cycle signal is deasserted as indicated by reference numeral 482 after the first and second cycles have been issued via shared bus 112.

Cycles 484, 494, 500, 512, and 522 indicate a secondary bus sequence analogous to the primary bus sequence of cycles 438, 448, 454, 464, and 474 just discussed. In cycle 484, a first segment of a secondary bus operation is shown and characterized by address field 486 on secondary address lines 414, data field 488 on secondary data lines 416, and the assertion of secondary bus signal 490. Address field 486 equates to the value of index register tag 626 of the appropriate shared peripheral 622 coupled to shared bus 112 while data field 488 evaluates to the desired internal register 632 of shared peripheral 622. The assertion of secondary bus write signal 418 as indicated by reference numeral 490 causes shared peripheral controller 100 and control unit 104 to detect the secondary bus operation's first segment and to buffer the appropriate information, such as the value of data field 488, in at secondary bus first register 130 (assuming that the first shared peripheral is the targeted device). Shared peripheral controller 100 prevents the secondary bus operation's first segment from reaching shared bus 112 until the operation's second segment is later detected (in cycle 500 as discussed below). After first segment 484 is complete, one or more cycles represented by cycle 494 of FIG. 4 may execute during which activity is occurring on primary bus 104. This primary bus activity may include any combination or sequence of primary bus operations that could include a completed first and second segment primary bus operation that would be issued to the shared peripheral via shared bus 112. The absence of shared bus activity during cycle (or cycles) 494 is intended to indicate that the secondary bus activity is prevented from reaching shared bus 112 until the second segment is detected. The secondary bus operation's second segment is detected in cycle 500. This second segment is characterized by the presence of a valid address field 502 and valid data field 504 during the assertion of either, but not both, secondary bus read signal 420 or secondary bus write signal 418 as indicated by reference numeral 506 all in a manner similar to the buffering of primary bus operations and the issuing of primary bus operations to shared bus 112 as discussed previously. In response to detecting second segment 500, shared peripheral controller 100 and control unit 114 are configured to issue the second operation's first and second segments in consecutive cycles 512 and 514 of shared bus 112. Address field 514 of cycle 512 is equivalent to address field 486 of first segment cycle 484 while data field 516 is equivalent to data field 488 of first segment cycle 484. The assertion of shared bus write signal 428 indicated by reference numeral 518 corresponds to the assertion 490 of secondary bus write signal 418 while the assertion 506 of the secondary bus read/write signals 418 and 420 corresponds to the assertion 528 of shared bus read/write signals 428 and 430. Similarly, address field 524 and data field 526 of second cycle 522 correspond to address field 502 and data field 504 of second segment cycle 500. Thus, shared peripheral controller 100 is configured to issue the secondary bus operation to shared bus 112 precisely as the operation was received via secondary bus 108 while assuring that the entire operation is completed in consecutive shared bus cycles. In one embodiment, a secondary bus extended cycle signal 508 is asserted upon detecting the second segment cycle 500 to prevent access to secondary bus 108 during the issuing of the secondary bus operation to shared bus 112. In an embodiment in which the secondary bus comprises a 68000 bus, for example, secondary bus extended cycle signal 422 might be suitably implemented as the DTACK signal. It will be appreciated by those familiar with the 68000 bus specification, that the bus does not include read or write signals such as those indicated in FIG. 4. In these embodiments, the read and write signals are produced internal to shared peripheral controller 100 from the R/W and UDS signals of the 68000 bus, but are shown in FIG. 4 for the sake of consistency. The signal labels indicated in FIG. 4 are not intended to limit the implementation of the invention to a particular bus specification.

Figure 5:
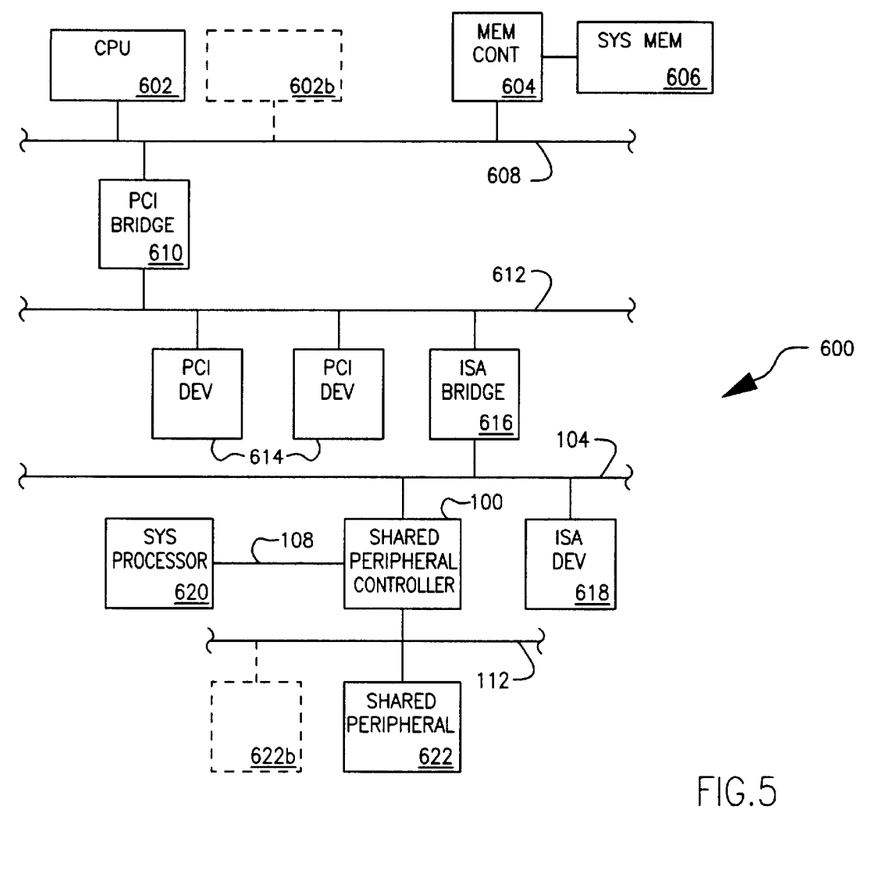
FIG. 5 is a block diagram of a computer system including the controller of FIG. 1.

Turning now to FIG. 5, one example of a computer system 600 according to the present invention is presented. In this embodiment, system 600 includes one or more central processing units 602 (a second of which is shown in phantom and indicated by reference numeral 602b) coupled to a PCI bridge 610 and a memory controller 604 via a host bus. Memory controller 604 is coupled to a system memory 606. As its name implies, PCI bridge 610 provides a link between host bus 608 and a peripheral bus 612 preferably compliant with the PCI specification. Various PCI peripheral devices 614 are shown coupled to peripheral bus 612. In addition, the preferred embodiment of the present invention includes a first processor in the form of PCI-to-ISA bridge 616 for coupling to a primary bus 104, which is preferably compliant with the ISA bus specification. One or more appropriate ISA devices 618 are connected to primary bus 104. Shared peripheral controller 100 according to the present invention is shown coupled between primary bus 104 and a secondary bus 108, to which a second processor in the form of service processor 620 is attached. The naming convention for primary bus 104 and secondary bus 108 is intended to simply distinguish between the two busses and is not intended to reflect the significance or priority of either bus. System process 620 may be suitably encountered in server applications to provide a mechanism by which system information is recovered or restored following a significant occurrence such as a power outage. Service processor 620 is preferably implemented with an embedded controller via a 68000 bus. One or more shared peripherals 622 (a second of which is shown in phantom and indicated by reference numeral 622b) are coupled to shared bus 112. Shared peripherals are desirable with respect to certain peripherals that may not be satisfactorily duplicated. A real time clock, for example, is difficult to duplicate because of problems associated with synchronizing two independently oscillating signals. In other embodiments, avoiding duplication of certain peripheral devices may be motivated by cost considerations. In any event, adequate sharing of shared peripheral 622 is provided by shared peripheral controller 100 in the manner described in the preceding discussion.

It will be apparent to those skilled in the art having the benefit of this disclosure that the present invention contemplates a device and method for effectively sharing a peripheral device between first and second busses without requiring revisions to the peripheral's device driver. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A shared peripheral controller, comprising:
   a primary bus interface adapted to receive a first operation from a first processor via a primary bus;
   a primary bus first register;
   a shared bus interface adapted to communicate with a first shared peripheral via a shared bus;
   a control unit coupled to the primary bus interface and configured to detect a first segment of the first operation issued by the first processor to the first shared peripheral and further configured to buffer the first segment in the primary bus first register until the control unit detects a second segment of the first operation, whereupon the control unit is configured to issue the first and second segments of the first operation to the first shared peripheral in consecutive cycles of the shared bus;
   a secondary bus interface adapted to receive a second operation from a second processor via a secondary bus; and
   a secondary bus first register;
   wherein the control unit is further coupled to the secondary bus interface and configured to detect a first segment of the second operation and further configured to buffer the second operation's first segment in the secondary bus first register until the control unit detects a second segment of the second operation, whereupon the control unit is configured to issue the second operation's first and second segments to the first shared peripheral in consecutive cycles of the shared bus.

2. The controller of claim 1, wherein the first segment of the first operation includes a data field and an address field, and further wherein the address field of the first segment is indicative of a primary bus first address associated with the first shared peripheral.

3. The controller of claim 2, wherein the data field of the first segment identifies one of a plurality of internal registers of the first shared peripheral.

4. The controller of claim 3, wherein the buffering of the first segment comprises storing the data field in the primary bus first register responsive to detecting that the address field comprises the primary bus first address.

5. A shared peripheral controller, comprising:
   a primary bus interface adapted to receive an operation from a first processor via a primary bus;
   a primary bus first register;
   a shared bus interface adapted to communicate with a first shared peripheral via a shared bus; and
   a control unit coupled to the primary bus interface and configured to detect a first segment of a first operation issued by the first processor to the first shared peripheral and further configured to buffer the first segment in the primary bus first register until the control unit detects a second segment of the first operation, whereupon the control unit is configured to issue the first and second segments of the first operation to the first shared peripheral in consecutive cycles of the shared bus;
   wherein the first segment of the first operation includes a data field and an address field, and further wherein the address field of the first segment is indicative of a primary bus first address associated with the first shared peripheral;
   wherein the first shared peripheral includes a plurality of internal registers, and further wherein the data field of the first segment is indicative of a selected internal register of the first shared peripheral.

6. The controller of claim 1, wherein the first shared peripheral comprises a real time clock.

7. The controller of claim 1, wherein the second processor comprises a service processor.

8. The controller of claim 7, wherein the secondary bus comprises a 68000 bus.

9. The controller of claim 1, further comprising a primary bus second register, wherein the control unit is configured to detect a first segment of an operation issued by the first processor to a second shared peripheral connected to the shared bus and to buffer the first segment in the primary bus second register until a second segment of the operation to the second shared peripheral is detected whereupon the controller is configured to issue the first and second segments of the operation to the second shared peripheral in consecutive shared bus cycles.

10. A method of controlling access to a first shared peripheral accessible via a primary bus and a secondary bus, the method comprising:
    detecting a first segment of a first operation issuing from a first processor via the primary bus and buffering the first segment of the first operation in a primary bus register until a second segment of the first operation is detected;

detecting bus activity on the secondary bus intermediate between the first and second segments of the first operation;

responsive to detecting the second segment of the first operation on the primary bus, issuing the first and second segments of the first operation to the first shared peripheral via a shared bus in consecutive cycles of the shared bus, whereby the activity occurring on the secondary bus intermediate between the first and second segments of the first operation is prevented from occurring intermediate between the first and second segments of the first operation on the shared bus;

detecting a first segment of a second operation issuing from a second processor via the secondary bus and buffering the second operation's first segment in a secondary bus register until a second segment of the second operation is detected;

detecting bus activity on the primary bus intermediate between the second operation's first and second segments; and responsive to detecting the second operation's second segment on the secondary bus, issuing the second operation's first and second segments to the first shared peripheral via the shared bus in consecutive cycles of the shared bus, whereby the activity occurring on the primary bus intermediate between the second operation's first and second segments is prevented from occurring intermediate between the second operation's first and second segments on the shared bus.

11. The method of claim 10, wherein detecting the first segment comprises comparing an address field of the first segment to a primary bus first address associated with the first shared peripheral.

12. The method of claim 11, wherein buffering the first segment comprises storing the primary bus first address in the primary bus first register.

13. A computer system, comprising:

a central processing unit;

a system memory coupled to the central processing unit via a host bus;

a host bus bridge coupled between the host bus and a PCI bus;

a first processor coupled between the PCI bus and a primary bus;

a shared peripheral controller connected to the primary bus;

a second processor coupled to the shared peripheral controller via a secondary bus;

a first shared peripheral coupled to the shared peripheral controller via a shared bus;

wherein the shared peripheral controller is configured to detect a first segment of a first operation from the first processor and further configured to buffer the first segment of the first operation in a primary bus register until the controller detects a second segment of the first operation, whereupon the controller is configured to issue the first and second segments of the first operation to the first shared peripheral in consecutive cycles of the shared bus whereby activity on the secondary bus detected by the controller intermediate between the first operation's first and second segments is prevented from occurring on the shared bus intermediate between the first operation's first and second segments; and wherein the shared peripheral controller is further configured to detect a first segment of a second operation from the second processor and still further configured to buffer the first segment of the second operation in a secondary bus register until the controller detects a second segment of the second operation, whereupon the controller is configured to issue the first and second segments of the second operation to the first shared peripheral in consecutive cycles of the shared bus, whereby activity occurring on the primary bus detected by the controller intermediate between the second operation's first and second segments is prevented from occurring on the shared bus intermediate between the second operation's first and second segments.

14. The system of claim 13, wherein the primary bus comprises and ISA bus and the first processor comprises an ISA bridge.

15. The system of claim 13, where the secondary processor comprises a service processor and the secondary bus comprises a 68000 bus.

16. The system of claim 13, wherein the first shared peripheral comprises a real time clock.

17. The system of claim 13, wherein the first shared peripheral comprises a plurality of internal registers wherein each of the plurality of internal registers is indirectly addressable by storing an internal register address in an index register of the first shared peripheral and thereafter addressing a data register of the first shared peripheral.

* * * * *